US012281629B2

(12) United States Patent
Moreno

(10) Patent No.: US 12,281,629 B2
(45) Date of Patent: Apr. 22, 2025

(54) SEALING RING GLAND AND FUEL PUMP INCLUDING THE SAME

(71) Applicant: DELPHI TECHNOLOGIES IP LIMITED, St. Michael (BB)

(72) Inventor: Alejandro Moreno, El Paso, TX (US)

(73) Assignee: PHINIA JERSEY HOLDINGS LLC, Wilmington, DE (US)

( * ) Notice: Subject to any disclaimer, the term of this patent is extended or adjusted under 35 U.S.C. 154(b) by 0 days.

(21) Appl. No.: 18/201,928

(22) Filed: May 25, 2023

(65) Prior Publication Data

US 2023/0296069 A1 Sep. 21, 2023

Related U.S. Application Data

(63) Continuation of application No. 17/695,133, filed on Mar. 15, 2022, now Pat. No. 11,725,616.

(51) Int. Cl.

| | |
|---|---|
| ***F02M 37/18*** | (2006.01) |
| ***F02M 37/04*** | (2006.01) |
| ***F02M 37/20*** | (2006.01) |
| ***F04D 5/00*** | (2006.01) |
| ***F04D 9/00*** | (2006.01) |
| ***F04D 9/04*** | (2006.01) |

(52) U.S. Cl.

CPC .......... *F02M 37/18* (2013.01); *F02M 37/048* (2013.01); *F02M 37/20* (2013.01); *F04D 5/002* (2013.01); *F04D 9/003* (2013.01); *F04D 9/041* (2013.01)

(58) Field of Classification Search

CPC ...... F02M 37/18; F02M 37/048; F02M 37/20; F04D 5/002; F04D 9/003; F04D 9/041

USPC .......................................................... 415/55.5

See application file for complete search history.

(56) References Cited

U.S. PATENT DOCUMENTS

| | | | | | |
|---|---|---|---|---|---|
| 4,324,532 | A | | 4/1982 | Knife | |
| 4,370,110 | A | * | 1/1983 | Nagely | F04C 2/086 418/206.7 |
| 4,571,159 | A | * | 2/1986 | Beardmore | F02M 37/08 417/540 |
| 4,692,245 | A | * | 9/1987 | Church | B01D 36/001 210/232 |
| 5,013,222 | A | | 5/1991 | Sokol et al. | |
| 5,149,252 | A | | 9/1992 | Tuckey et al. | |
| 5,655,892 | A | | 8/1997 | Cherniawski et al. | |
| 5,702,234 | A | * | 12/1997 | Pieters | F04C 15/0026 418/206.7 |
| 6,047,684 | A | * | 4/2000 | Hiraku | F02M 37/041 123/497 |
| 6,162,012 | A | | 12/2000 | Tuckey et al. | |

(Continued)

*Primary Examiner* — Kurt Philip Liethen
*Assistant Examiner* — John D Bailey
(74) *Attorney, Agent, or Firm* — WARNER NORCROSS + JUDD LLP

(57) ABSTRACT

A sealing ring gland receives a sealing ring. The sealing ring gland includes an inner wall surface which seals against an inner periphery of the sealing ring. An outer wall surface is radially offset from the inner wall surface and seals against an outer periphery of the sealing ring. The sealing ring is axially compressed between an upper wall surface and a lower wall surface of the sealing ring gland. At least one of the upper wall surface and the lower wall surface includes an expansion volume which provides space for the sealing ring to expand upon swelling of the sealing ring.

16 Claims, 11 Drawing Sheets

(56) References Cited

U.S. PATENT DOCUMENTS

| | | | | |
|---|---|---|---|---|
| 6,231,318 | B1 * | 5/2001 | Cotton | F02M 37/10 415/55.1 |
| 6,450,590 | B1 | 9/2002 | Leventhal | |
| 6,499,941 | B1 | 12/2002 | Fischer | |
| 8,157,542 | B2 | 4/2012 | Boutros | |
| 11,466,689 | B1 | 10/2022 | Lai | |
| 2002/0071758 | A1 | 6/2002 | Aslam et al. | |
| 2003/0084941 | A1 | 5/2003 | Fischer et al. | |
| 2003/0192508 | A1 * | 10/2003 | Kishimoto | F02M 55/04 123/497 |
| 2004/0062634 | A1 | 4/2004 | Yu et al. | |
| 2005/0000579 | A1 | 1/2005 | Burrola et al. | |
| 2005/0058549 | A1 | 3/2005 | York et al. | |
| 2005/0163636 | A1 * | 7/2005 | Becker | F04D 5/002 417/572 |
| 2006/0228242 | A1 | 10/2006 | West et al. | |
| 2006/0237672 | A1 | 10/2006 | Moreno et al. | |
| 2008/0216801 | A1 * | 9/2008 | Kanamaru | B01D 35/26 123/511 |
| 2010/0181246 | A1 * | 7/2010 | Kiedaisch | B01D 36/001 210/232 |
| 2013/0133765 | A1 | 5/2013 | Israelson et al. | |
| 2014/0166109 | A1 | 6/2014 | Takai et al. | |
| 2014/0212272 | A1 | 7/2014 | Castillo et al. | |
| 2014/0314591 | A1 | 10/2014 | Herrera et al. | |
| 2015/0198172 | A1 | 7/2015 | Hermmen, Jr. et al. | |
| 2016/0369797 | A1 * | 12/2016 | Pribanic | H02K 7/14 |
| 2017/0023016 | A1 | 1/2017 | Fischer | |
| 2018/0258893 | A1 | 9/2018 | Fischer | |
| 2018/0320695 | A1 * | 11/2018 | Zielberg | F04D 15/0038 |
| 2020/0309075 | A1 | 10/2020 | Carrillo et al. | |
| 2020/0368641 | A1 | 11/2020 | Mai et al. | |

* cited by examiner

SEALING RING GLAND AND FUEL PUMP INCLUDING THE SAME

CROSS-REFERENCE TO RELATED APPLICATIONS

This application is a continuation of prior U.S. application Ser. No. 17/695,133, filed Mar. 15, 2022, the disclosure of which is incorporated by reference in its entirety.

TECHNICAL FIELD OF INVENTION

The present invention relates to a sealing ring gland, more particularly to sealing ring gland with features which accommodates swelling of the sealing ring, and also to a fuel pump including such a sealing ring gland.

BACKGROUND OF INVENTION

In-tank fuel pumps which supply fuel, for example, gasoline, diesel fuel, alcohol, ethanol, the like, and blends thereof, to an internal combustion engine, for example an internal combustion engine of a motor vehicle, have been widely used for many years where such fuel pumps are submersed in the fuel within the fuel tank. In some designs of such fuel pumps, two elastomeric seals are used to prevent external leakage of fuel and to maintain a compressive load on internal components of the fuel pump. An O-ring is used to produce a radial seal between an end plate and an inside surface of a shell or housing at one end of the of the fuel pump while a gasket is used at the opposite end to form an axial seal and provide a spring force or compressive load to maintain contact between components of a pump section contained within the shell. An example of such a fuel pump is illustrated in United States Patent Application Publication No. US2002/0071758 A1 to Aslam et al. In some fuel pump designs it may be desirable to eliminate the gasket and use the O-ring to provide both the radial seal and the axial compressive load, however, standard O-ring gland designs must accommodate for swelling of the O-ring by providing clearance in the axial direction. However, providing axial clearance inhibits the O-ring to provide axial load on the internal pump components.

What is needed is a fuel pump and O-ring gland which minimizes or eliminates one or more of the shortcomings as set forth above.

SUMMARY OF THE INVENTION

Briefly described, a sealing ring gland is provided which receives a sealing ring therein. The sealing ring gland includes an inner wall surface which circumferentially surrounds an axis, the inner wall surface being configured to circumferentially seal against an inner periphery of the sealing ring; an outer wall surface which circumferentially surrounds the axis and is radially offset from the inner wall surface, the outer wall surface being configured to circumferentially seal against an outer periphery of the sealing ring; an upper wall surface which is transverse to the axis and which is configured to axially compress the sealing ring; and a lower wall surface which is transverse to the axis and axially offset from the upper wall surface and which is configured to axially compress the sealing ring when the sealing ring is axially compressed by the upper wall surface. At least one of the upper wall surface and the lower wall surface includes an expansion volume which is recessed into the at least one of the upper wall surface and the lower wall surface, thereby providing space for the sealing ring to expand upon swelling of the sealing ring.

A fuel pump includes an upper plate having an upper plate flow channel formed in a lower surface thereof; a lower plate having a lower plate flow channel formed in an upper surface thereof such that the upper surface of the lower plate faces toward the lower surface of the upper plate; a pumping element located axially between the upper plate and the lower plate such that rotation of the pumping element causes fuel to be drawn into, and pressurized within, the upper plate flow channel and the lower plate flow channel; and a sealing ring which is resilient and compliant and located within a sealing ring gland. The sealing ring gland includes an inner wall surface which circumferentially surrounds an axis such that the sealing ring circumferentially seals against an inner periphery of the sealing ring; an outer wall surface which circumferentially surrounds the axis and is radially offset from the inner wall surface, the outer wall surface seals circumferentially sealing against an outer periphery of the sealing ring; an upper wall surface which is transverse to the axis and which is configured to axially compress the sealing ring; and a lower wall surface which is transverse to the axis and axially offset from the upper wall surface, the sealing ring being axially compressed by the upper wall surface and the lower wall surface such that axial compression of the sealing ring compresses the upper plate and the lower plate against each other. At least one of the upper wall surface and the lower wall surface includes an expansion volume which is recessed into the at least one of the upper wall surface and the lower wall surface, thereby providing space for the sealing ring to expand upon swelling of the sealing ring.

The sealing ring gland and fuel pump described herein allows for the sealing ring to provide both radial sealing and axial compression while minimizing or eliminating concerns which arise from swelling of the sealing ring over time.

BRIEF DESCRIPTION OF DRAWINGS

This invention will be further described with reference to the accompanying drawings in which:

FIG. 7 shows an electric motor partially installed and FIG. 8 shows the electric motor fully installed;

DETAILED DESCRIPTION OF INVENTION

Figure 1:
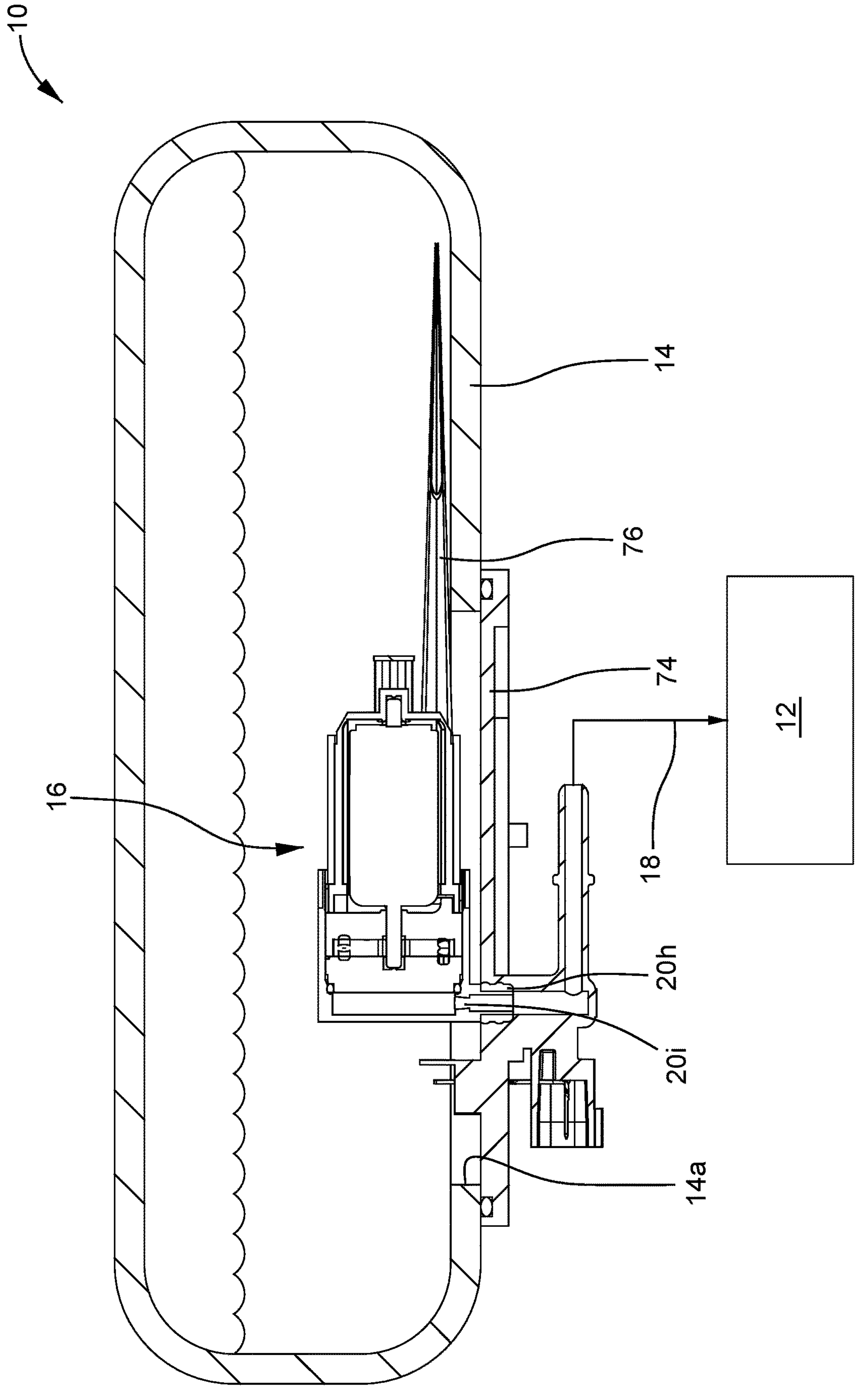
FIG. 1 is a schematic view of a fuel system in accordance with the present disclosure.

Referring initially to FIG. 1, a fuel system 10 is shown in accordance with the present disclosure for supplying fuel to a fuel consuming device, illustrated by way of non-limiting example only, as an internal combustion engine 12. The fuel of fuel system 10 may be any liquid fuel customarily used, for example only, gasoline, diesel fuel, alcohol, ethanol, and the like, and blends thereof.

Fuel system 10 includes a fuel tank 14 for storing a quantity of fuel and a fuel pump 16 for pumping fuel from fuel tank 14 to internal combustion engine 12. Fuel that is pumped by fuel pump 16 is communicated to internal combustion engine 12 through a fuel supply line 18. Fuel pump 16 is an electric fuel pump which will be described in greater detail in the paragraphs that follow.

Figure 2:
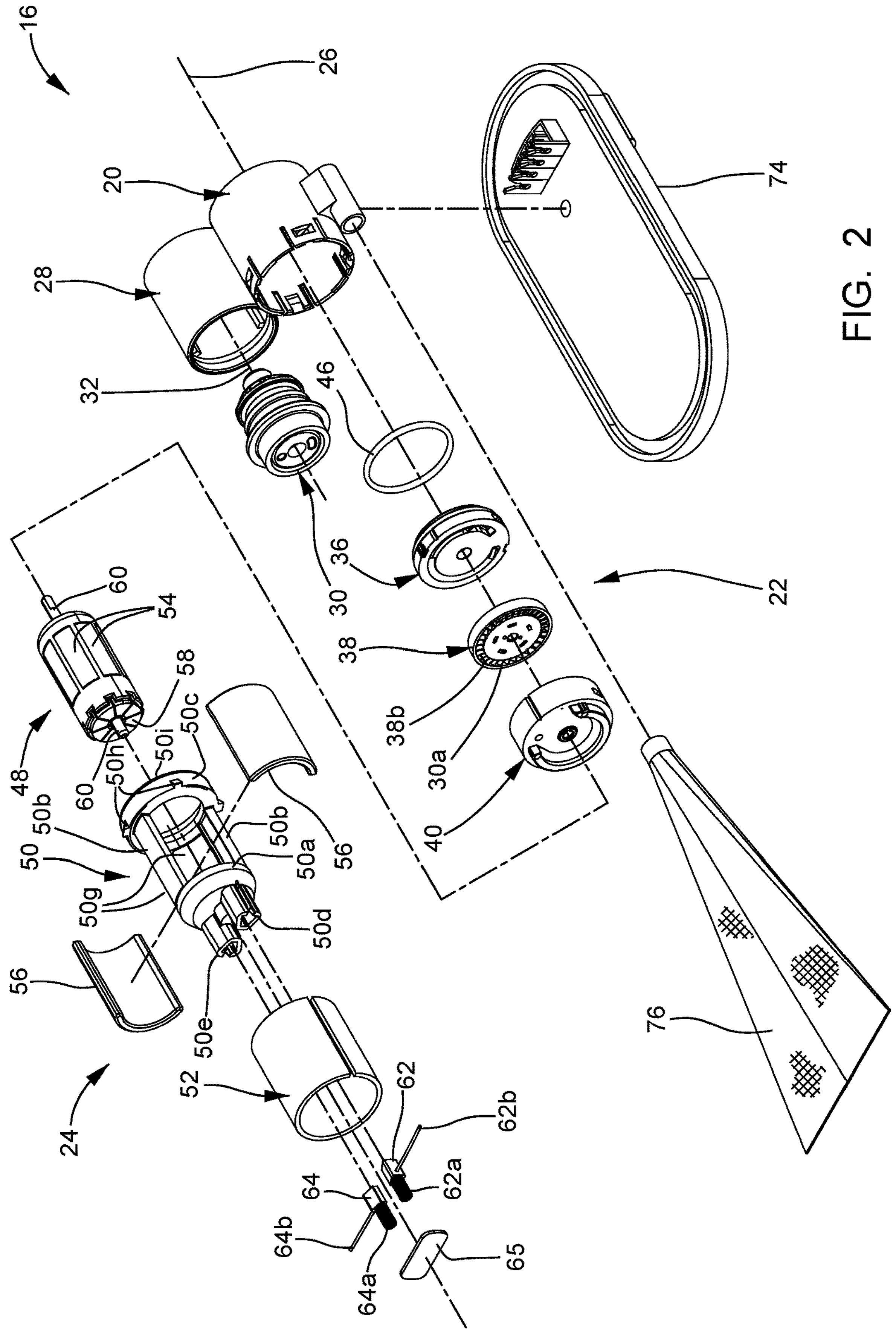
FIG. 2 is an exploded isometric view of a fuel pump in accordance with the present disclosure.
Figure 3:
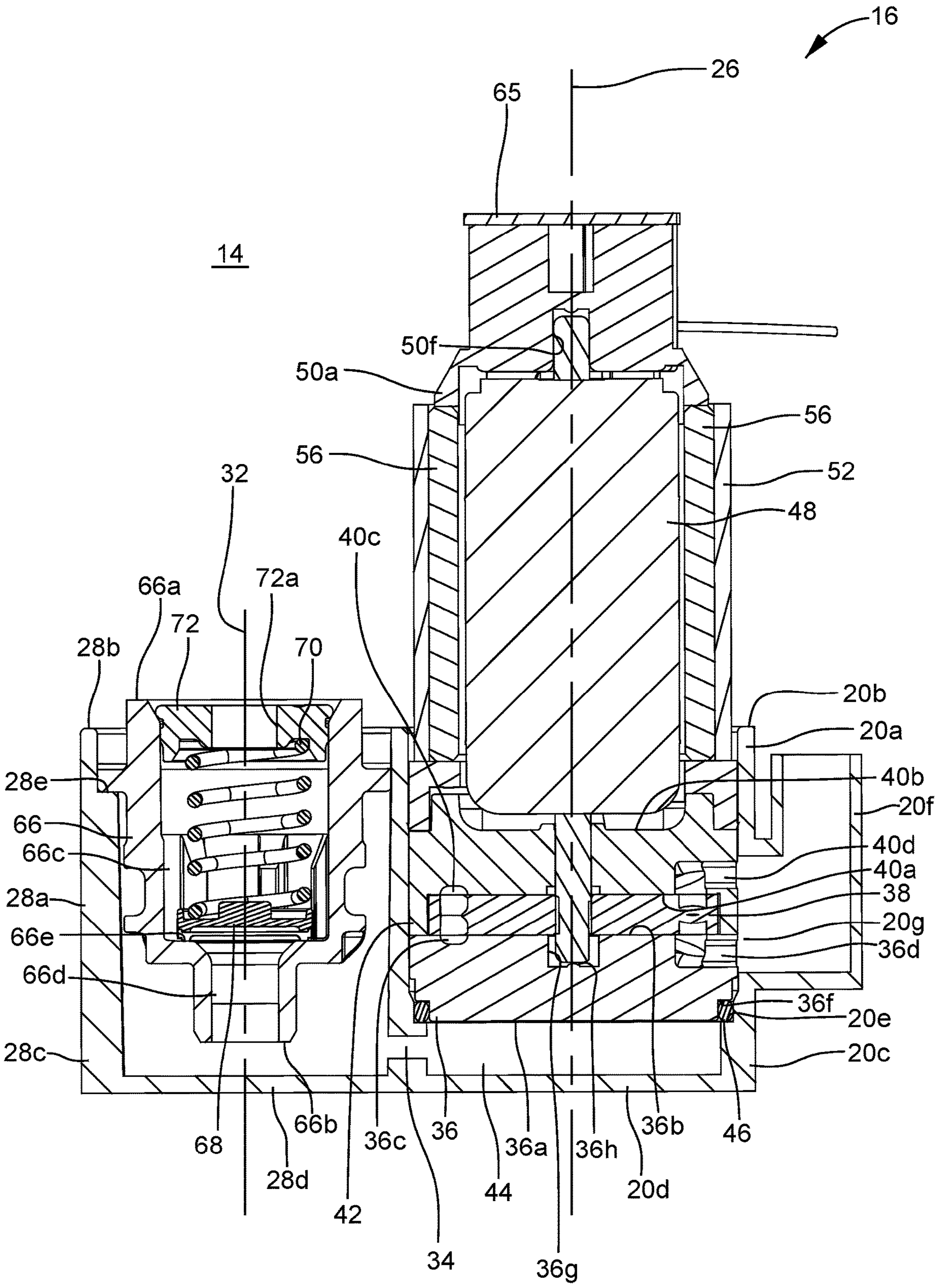
FIGS. 3 and 4 are cross-sectional views of the fuel pump taken through two different sectioning planes.
Figure 4:
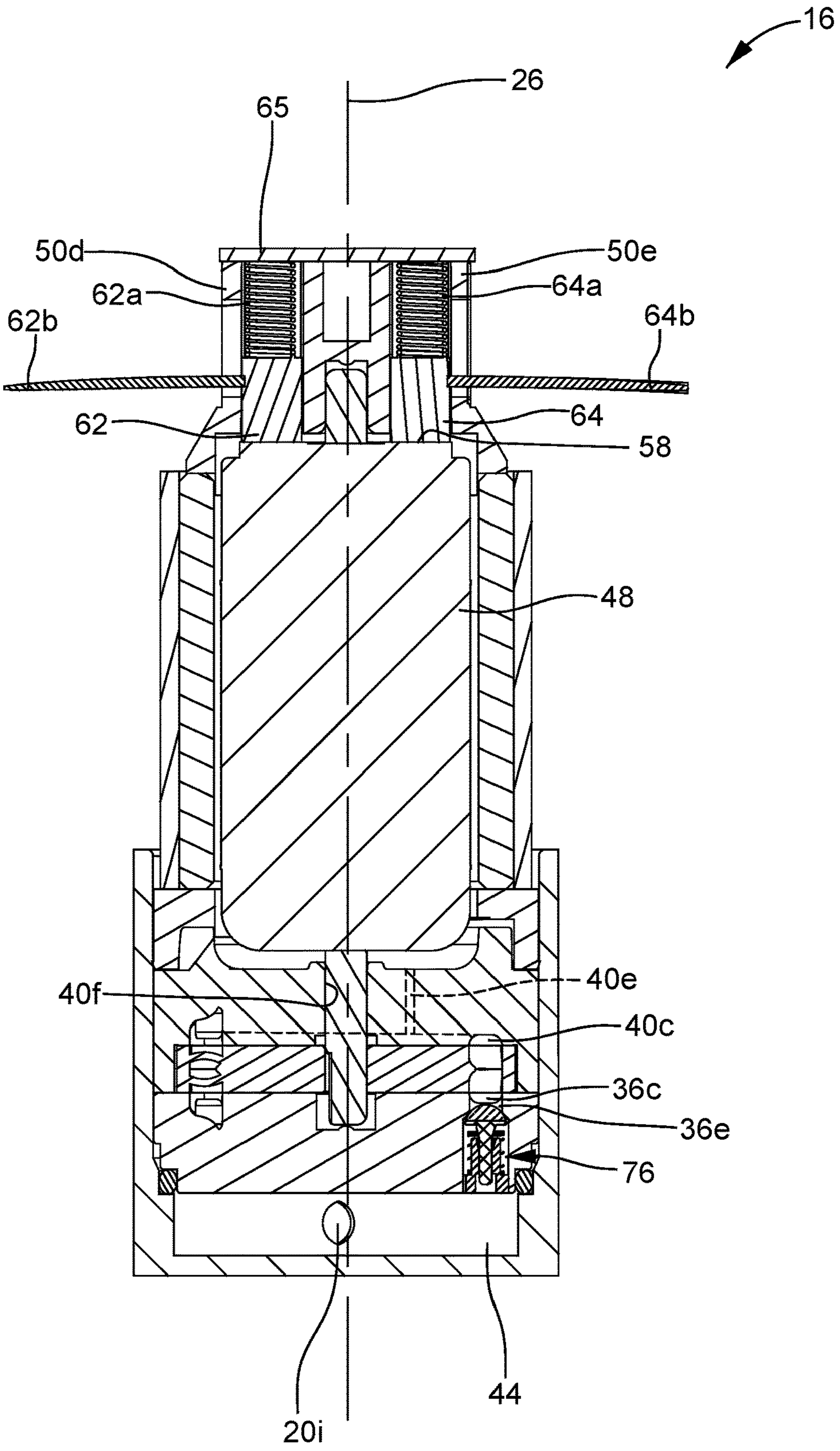

Additional reference will now be made to FIGS. 2-4 where FIG. 2 is an exploded isometric view of fuel pump 16 and FIGS. 3 and 4 are axial cross-sectional views of fuel pump 16 taken through different sectioning planes. Fuel pump 16 generally includes a pump holder 20, a pumping section 22 received within pump holder 20, and an electric motor 24 which is fixed to pump holder 20 and which rotates a portion of pumping section 22, thereby pumping fuel from fuel tank 14 to internal combustion engine 12.

Pump holder 20 includes a pump holder sidewall **20*a* which is centered about, and extends along, an axis 26 from a first end 20*b* to a second end 20*c* such that pump holder sidewall 20*a* is annular in shape and surrounds axis 26. Second end 20*c* is closed off by a pump holder end wall 20*d* which is transverse to axis 26. The inner periphery of pump holder sidewall 20*a* is stepped in diameter, thereby forming a shoulder 20*e* which is annular in shape and which faces away from pump holder end wall 20*d*. An inlet port 20*f* is provided on the outer periphery of pump holder sidewall 20*a* such that inlet port 20*f* is tubular and serves as a fuel inlet through which fuel enters fuel pump 16 from fuel tank 14. A pump holder inlet passage 20*g* extends through pump holder sidewall 20*a* such that pump holder inlet passage 20*g* provides fluid communication between the interior of inlet port 20*f* and the inner periphery of pump holder sidewall 20*a*. While one pump holder inlet passage 20*g* has been illustrated herein, it should be understood that a greater quantity may be provided. Pump holder 20 also includes an outlet port 20*h* which is tubular and which serves as a fuel outlet through which fuel exits fuel pump 16. An outlet passage 20*i* extends through either pump holder sidewall 20*a* or pump holder end wall 20*d*, however, for illustrative purposes, outlet passage 20*i* has been illustrated herein as extending through pump holder sidewall 20*a*. Outlet passage 20*i* provides fluid communication between the inner periphery of pump holder sidewall 20*a* and the interior of outlet port 20*h*. As illustrated herein, outlet port 20*h* is provided on the outer periphery of pump holder sidewall 20*a*, however, outlet port 20*h* may alternatively be provided on pump holder end wall 20*d* if outlet passage 20*i* extends through pump holder end wall 20*d*. Providing outlet port 20*h* on the pump holder end wall 20*d* may be desirable, for example, to accommodate mounting fuel pump 16 vertically rather than horizontally as shown in FIG. 1**.

In order to retain electric motor 24 to pump holder 20, pump holder sidewall **20*a* includes a plurality of retention windows 20*j* which extend radially therethrough such that retention windows 20*j* are circumferentially spaced around pump holder sidewall 20*a* and are located proximal to first end 20*b*, but spaced away from first end 20*b* in a direction toward second end 20*c*. While four retention windows 20*j* have been illustrated herein, a lesser quantity or a greater quantity of retention windows 20*j* may be provided depending on the retention needs. In order to increase the flexibility of pump holder sidewall 20*a*, thereby aiding in assembly of electric motor 24 to pump holder 20, pump holder sidewall 20*a* may include a plurality of slots 20*k* which extend from first end 20*b* toward second end 20*c*. One or more slots 20*k* are located between adjacent pairs of retention windows 20*j* and extend toward second end 20*c* slightly further than retention windows 20*j*, however, the extent to which slots 20*k* extend may be tailored in order to provide different magnitudes of flexibility to pump holder sidewall 20*a* depending on the retention requirements. As illustrated in the figures, eight slots 20*k* have been illustrated, however, a lesser quantity or a greater quantity of slots 20*k*** may be provided.

A pressure regulator holder 28 may be integrally formed with pump holder 20 in order to hold a pressure regulator 30 which regulates the pressure of fuel supplied to internal combustion engine 12. Pressure regulator holder 28 includes a pressure regulator holder sidewall **28*a* which is centered about, and extends along, an axis 32 from a first end 28*b* to a second end 28*c* such that pressure regulator holder sidewall 28*a* is annular in shape and surrounds axis 32. Axis 26 and axis 32 may be parallel to, and laterally offset from, each other such that the integral nature of pump holder 20 and pressure regulator holder 28 results in a portion of pump holder sidewall 20*a* and a portion of pressure regulator holder sidewall 28*a* being integrally formed and being common to both pump holder 20 and pressure regulator holder 28 which may be most easily viewed in FIGS. 2 and 3. Second end 28*c* is closed off by a pressure regulator holder end wall 28*d* which is transverse to axis 32. A pressure regulation passage 34 extends through the common portion of pump holder sidewall 20*a* and pressure regulator holder sidewall 28*a*, thereby providing fluid communication between the interior of pump holder 20 and the interior of pressure regulator holder 28. While pump holder 20 and pressure regulator holder 28 have been illustrated herein as being arranged laterally relative to each other, other respective orientations are also anticipated, for example to accommodate different fuel tank environments. In one example, pump holder 20 and pressure regulator holder 28 may each be arranged axially relative to each other such that pump holder 20 and pressure regulator holder 28 include pump holder end wall 20*d* in common and such that pressure regulation passage 34 extends through pump holder end wall 20*d*. In another example, axis 26 and axis 32** may be not be parallel and may alternatively be perpendicular to each other or arranged at some other angle relative to each other.

Pumping section 22 includes a lower plate 36, a pumping element illustrated as impeller 38, and an upper plate 40, each of which is located within pump holder sidewall **20*a*. Lower plate 36 is disposed at the end of pumping section 22 that is proximal to pump holder end wall 20*d* and distal from electric motor 24 while upper plate 40 is disposed at the end of pumping section 22 that is distal from pump holder end wall 20*d* and proximal to electric motor 24. Both lower plate 36 and upper plate 40 are fixed relative to pump holder 20 in order to prevent relative movement between lower plate 36 and upper plate 40 with respect to pump holder 20. Upper plate 40 defines a spacer ring 42 on the side of upper plate 40 that faces toward lower plate 36. Impeller 38 is disposed axially between lower plate 36 and upper plate 40 such that impeller 38 is radially surrounded by spacer ring 42. Spacer ring 42 is dimensioned to be slightly thicker than the dimension of impeller 38 in the direction of axis 26, i.e. the dimension of spacer ring 42 in the direction of axis 26 is greater than the dimension of impeller 38 in the direction of axis 26. Spacer ring 42 is also dimensioned to have an inside diameter that is larger than the outside diameter of impeller 38 to allow impeller 38 to rotate freely within spacer ring 42 and axially between lower plate 36 and upper plate 40**.

Impeller 38 is rotationally coupled to electric motor 24, and rotates about axis 26 between lower plate 36 and upper plate 40. While the pumping element has been illustrated as impeller 38, it should now be understood that other pumping elements may alternatively be used, by way of non-limiting example only, a gerotor, gears, or roller vanes. Furthermore, while spacer ring 42 is illustrated as being made as a single piece with upper plate 40, it should be understood that spacer ring 42 may alternatively be made as a separate piece that is captured axially between lower plate 36 and upper plate 40 or may be made as a single piece with lower plate 36.

Figure 5:
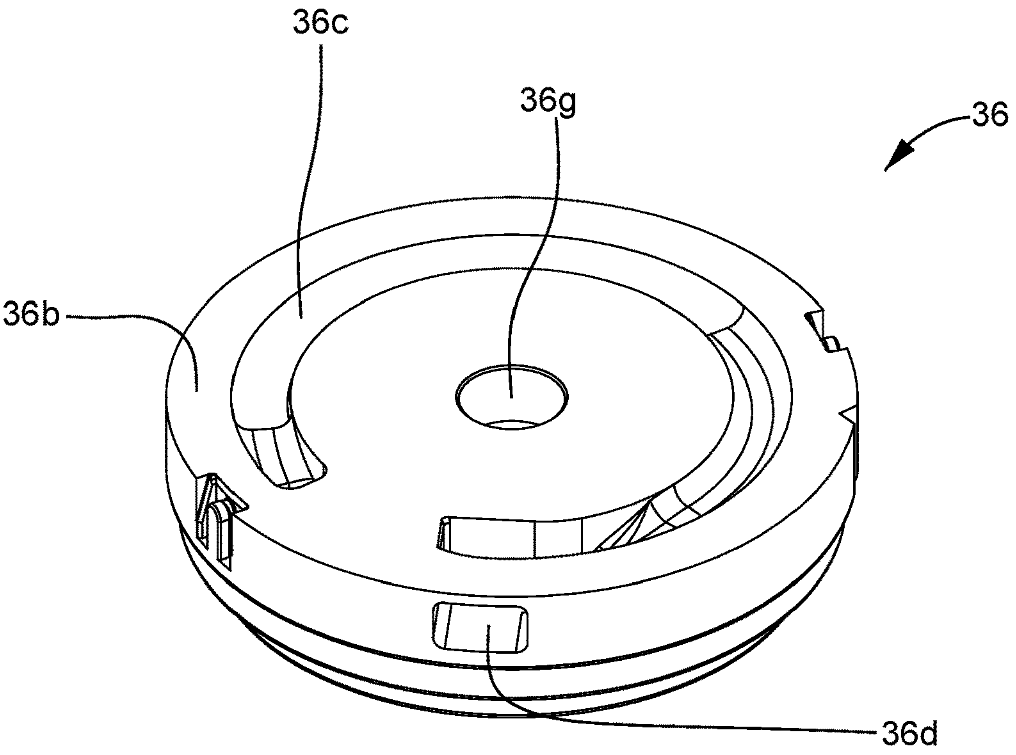
FIG. 5 is an isometric view of a lower plate of a pumping section of the fuel pump.

Lower plate 36 is generally cylindrical in shape and extends along axis 26 from a lower surface 36*a*, which is proximal to pump holder end wall 20*d*, to an upper surface 36*b* which contacts impeller 38. Lower plate 36 includes a lower plate flow channel 36*c* formed in upper surface 36*b*. Lower plate 36 also includes a lower plate inlet passage 36*d* that extends radially inward from the outer periphery of lower plate 36 such that lower plate inlet passage 36*d* connects to lower plate flow channel 36*c* at one end thereof as can be seen in FIG. 5. Lower plate inlet passage 36*d* is aligned with pump holder inlet passage 20*g* of pump holder 20, and in this way, lower plate inlet passage 36*d* provides fluid communication from pump holder inlet passage 20*g* of pump holder 20 to lower plate flow channel 36*c*. Lower plate 36 also includes a lower plate outlet passage 36*e* which extends to lower surface 36*a* from the end of lower plate flow channel 36*c* which is opposite from lower plate inlet passage 36*d*. Lower surface 36*a* of lower plate 36 is spaced axially apart from pump holder end wall 20*d* such that an outlet chamber 44 is formed axially between lower plate 36 and pump holder end wall 20*d* which is in fluid communication with lower plate outlet passage 36*e*. Lower plate 36 also includes a central recess 36*g* which extends axially into lower plate 36 from upper surface 36*b* such that central recess 36*g* is centered about axis 26 and such that central recess 36*g* terminates axially at a thrust surface 36*h*.

As can be seen in FIG. 3, the outer periphery of lower plate 36 is stepped such that a lower plate shoulder 36*f* is formed which faces toward pump holder end wall 20*d*. A sealing ring 46 is captured axially between lower plate shoulder 36*f* and shoulder 20*e* of pump holder 20 and is captured radially between the inner periphery of pump holder sidewall 20*a* the outer periphery of lower plate 36. Sealing ring 46 prevents pressurized fuel within outlet chamber 44 from escaping radially between lower plate 36 and pump holder 20. It should also be noted that sealing ring 46 is held in axial compression between lower plate shoulder 36*f* and shoulder 20*e* of pump holder 20 and therefore also urges lower plate 36 into contact with upper plate 40, thereby maintaining a close clearance between impeller 38 and lower plate 36 and between impeller 38 and upper plate 40 which is necessary for maintaining pumping efficiency, particularly when fuel pump 16 is initially started and pressure within outlet chamber 44 is low. Sealing ring 46 and the gland within which it received will be described in greater detail later.

Figure 6:
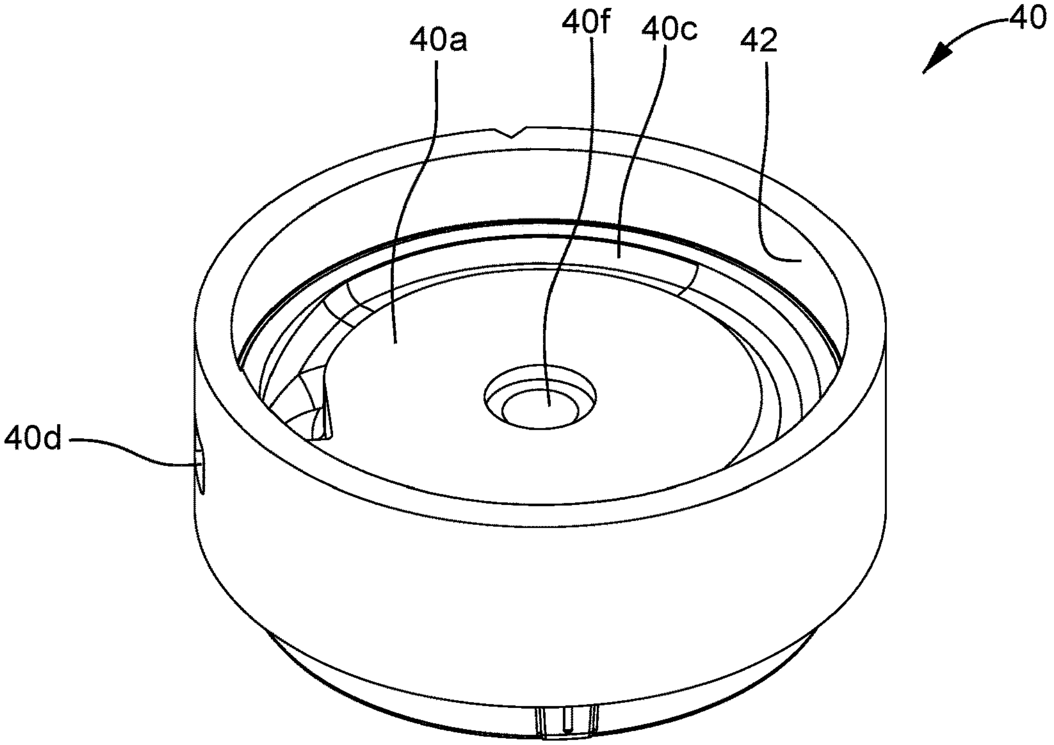
FIG. 6 is an isometric view of an upper plate of the pumping section.

Upper plate 40 is generally cylindrical in shape and extends along axis 26 from a lower surface 40*a*, which contacts impeller 38, to an upper surface 40*b* which is proximal to electric motor 24. Upper plate 40 includes an upper plate flow channel 40*c* formed in lower surface 40*a*. Upper plate 40 also includes an upper plate inlet passage 40*d* that extends radially inward from the outer periphery of upper plate 40 such that upper plate inlet passage 40*d* connects to upper plate flow channel 40*c* at one end thereof as can be seen in FIG. 6 where it should be noted that upper plate 40 is shown inverted from the orientation shown in FIGS. 3 and 4. Upper plate inlet passage 40*d* is aligned with pump holder inlet passage 20*g* of pump holder 20, and in this way, upper plate inlet passage 40*d* provides fluid communication from pump holder inlet passage 20*g* of pump holder 20 to upper plate flow channel 40*c*. Upper plate 40 also includes a vapor bleed passage 40*e* which extends to upper surface 40*b* of upper plate 40 from upper plate flow channel 40*c*. Vapor bleed passage 40*e* provides a path to purge fuel vapor which aids in priming and provides cooling and lubrication to electric motor 24 by directing a flow of fuel at electric motor 24. Upper plate 40 also includes a central aperture 40*f* which extends axially therethrough from upper surface 40*b* to lower surface 40*a* such that central aperture 40*f* is centered about axis 26. Central aperture 40*f* provides a bearing surface to electric motor 24 as will be described in greater detail later.

Impeller 38 includes a plurality of impeller blades 38*a* arranged in a polar array radially surrounding and centered about axis 26 such that impeller blades 38*a* are aligned with lower plate flow channel 36*c* and upper plate flow channel 40*c*. Impeller blades 38*a* are each separated from each other by respective impeller blade chambers 38*b* that pass through impeller 38 in the general direction of axis 26. Impeller 38 may be made, for example only, by a plastic injection molding process in which the preceding features of impeller 38 are integrally molded as a single piece of plastic.

Electric motor 24 includes a rotor or armature 48 which rotates about axis 26, a motor frame 50, and a flux carrier 52. One of armature 48 and motor frame 50 includes a plurality of circumferentially spaced motor windings and the other of armature 48 and motor frame 50 includes a plurality of magnets. As embodied herein, armature 48 includes a plurality of motor windings 54 which are circumferentially spaced around armature 48 and motor frame 50 includes a pair of magnets 56 which are each in the shape of a segment of a hollow cylinder; however, it should be understood that this arrangement may alternatively be reversed. In order to switch electric current through motor windings 54, armature 48 also includes a commutator portion 58. Armature 48 also includes a motor shaft 60 which is centered about axis 26 and which extends axially from both ends of armature 48. The lower end of motor shaft 60 extends through central aperture 40*f* of upper plate 40 such that motor shaft 60 is sized relative to central aperture 40*f* to allow motor shaft 60 to rotate freely therein while limiting movement of motor shaft 60 laterally relative to axis 26. The lower end of motor shaft 60 is also rotationally coupled to impeller 38, for example through complementary geometries of motor shaft 60 and impeller 38, thereby causing impeller 38 to rotate together with armature 48 and motor shaft 60. Axial movement of motor shaft 60 toward lower plate 36 is limited by motor shaft 60 abutting thrust surface 36*h* in a direction downward as oriented in FIG. 3.

Motor frame 50 includes a top section 50*a* which is distal from pumping section 22, a plurality of circumferentially spaced legs 50*b* extending axially from top section 50*a* toward pumping section 22, and a base section 50*c* axially spaced apart from top section 50*a* by legs 50*b*. Top section 50*a*, legs 50*b*, and base section 50*c* are preferably integrally formed from a single piece of plastic, for example only, by a plastic injection molding process.

Top section 50*a* of motor frame 50 includes a first brush holder 50*d* and a second brush holder 50*e* which are each hollow and which each extend in a direction parallel to axis 26. A first carbon brush 62 is disposed within first brush holder 50*d* and is urged into contact with commutator portion 58 of armature 48 by a first brush spring 62*a*. First brush holder 50*d* includes an axially extending slot which allows a first shunt wire 62*b* to extend out of first brush holder 50*d* and accommodates movement of first carbon brush 62. A second carbon brush 64 is disposed within second brush holder 50*e* and is urged into contact with commutator portion 58 of armature 48 by a second brush spring 64*a*. Second brush holder 50*e* includes an axially extending slot which allows a second shunt wire 64*b* to extend out of second brush holder 50*e* and accommodates movement of second carbon brush 64. First carbon brush 62 and second carbon brush 64 deliver electrical power to motor windings 54 through first shunt wire 62*b* and second shunt wire 64*b* respectively and via commutator portion 58, thereby rotating armature 48 and motor shaft 60 about axis 26. A brush retainer 65 closes off the ends of first brush holder 50*d* and second brush holder 50*e* which are distal from commutator portion 58, thereby capturing first carbon brush 62 and second carbon brush 64 within first brush holder 50*d* and second brush holder 50*e* respectively and providing a surface for first brush spring 62*a* and second brush spring 64*a* to push against in order to urge first carbon brush 62 and second carbon brush 64 into contact with commutator portion 58. Brush retainer 65 is fixed to first brush holder 50*d* and second brush holder 50*e*, for example, with one or more of adhesive, welding, heat staking, mechanical fasteners, interlocking features, and the like.

Top section 50*a* of motor frame 50 defines an upper aperture 50*f* therein which radially supports an upper end of motor shaft 60. Motor shaft 60 and upper aperture 50*f* are sized in order to allow motor shaft 60 to rotate freely within upper aperture 50*f* while limiting movement of motor shaft 60 laterally relative to axis 26. Axial movement of motor shaft 60 away from pumping section 22 is limited by motor shaft 60 abutting an upper thrust surface, which terminates upper aperture 50*f*, in a direction upward as oriented in FIG. 3.

Legs 50*b* are preferably equally circumferentially spaced around top section 50*a* and base section 50*c* and define motor frame openings 50*g* between legs 50*b*. Motor frame openings 50*g* extend axially from top section 50*a* to base section 50*c*. One magnet 56 is disposed within each motor frame opening 50*g*. Magnets 56 may be inserted within respective motor frame openings 50*g* after motor frame 50 has been formed. Alternatively, magnets 56 may be insert molded with motor frame 50 when motor frame 50 is formed by a plastic injection molding process. In this way, magnets 56 and legs 50*b* radially surround armature 48. While two legs 50*b* and two magnets 56 have been illustrated, it should be understood that other quantities of legs 50*b* and magnets 56 may be included.

Figure 7:
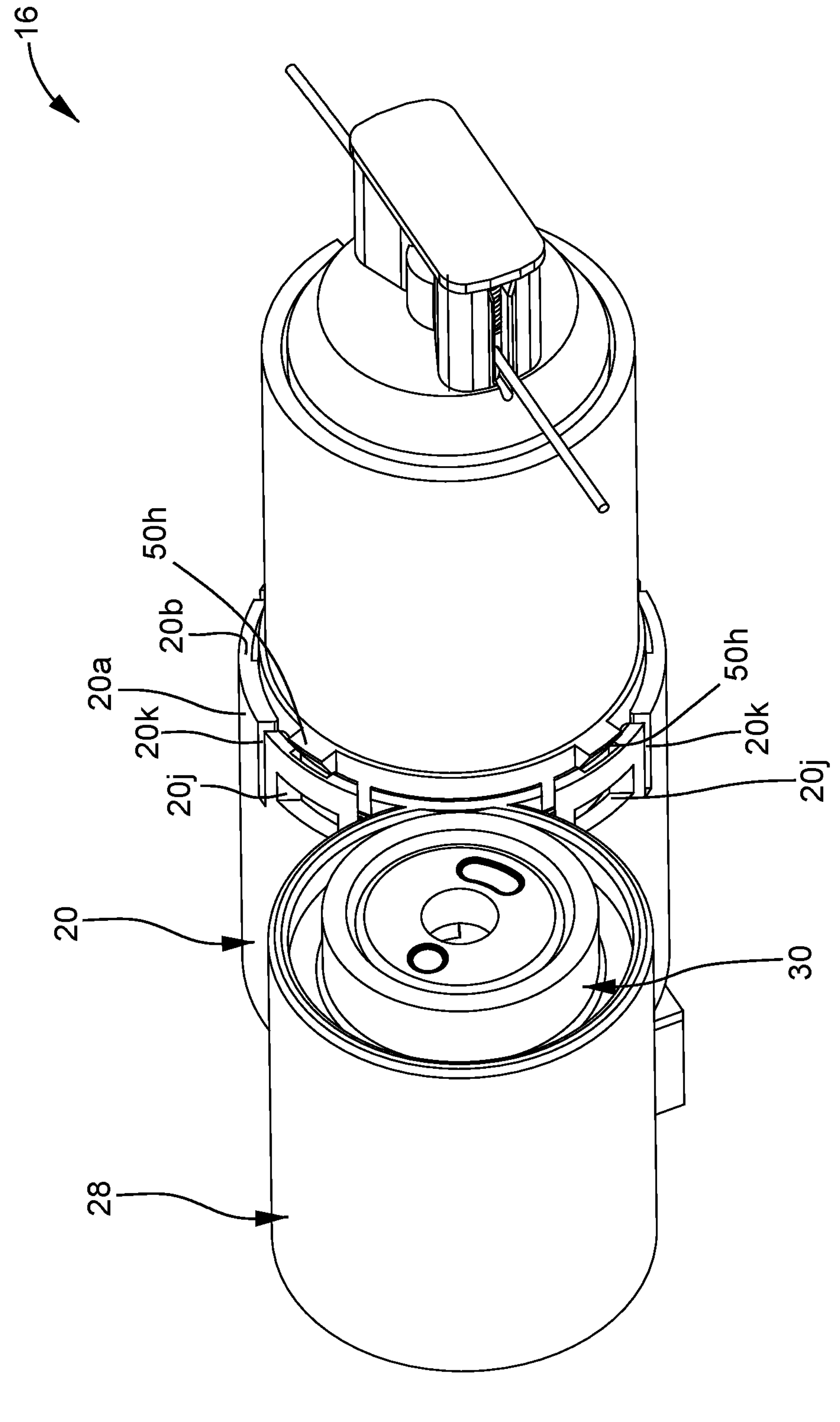
FIGS. 7 and 8 are isometric views of the fuel pump where
Figure 8:
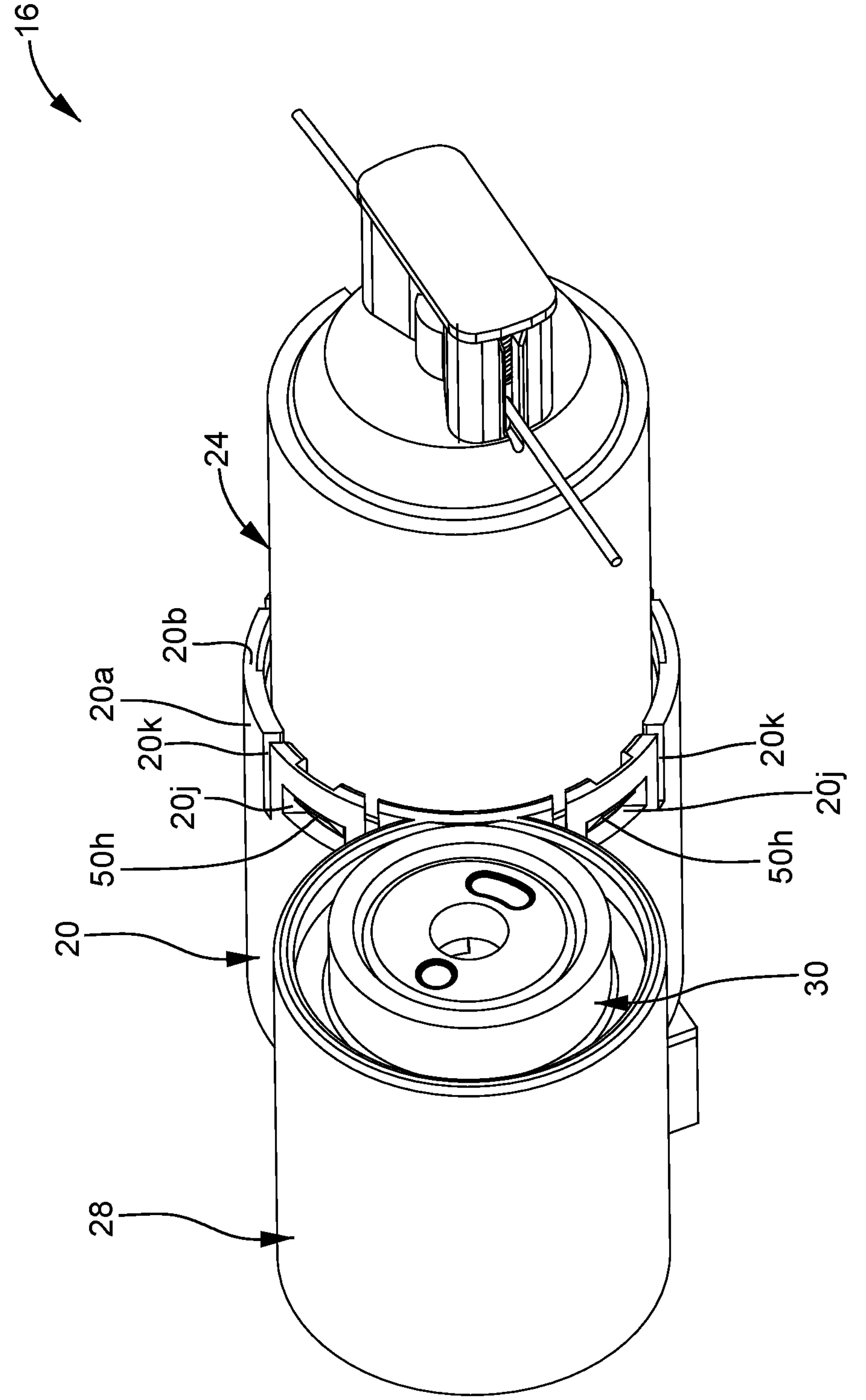

Base section 50*c* is annular in shape and connects legs 50*b* to each other. Base section 50*c* is coaxial with upper aperture 50*f* and receives a portion of upper plate 40 closely therein such that radial movement of upper plate 40 within base section 50*c* is substantially prevented. Since base section 50*c* is coaxial with upper aperture 50*f*, a coaxial relationship is maintained between upper aperture 50*f* and central aperture 40*f* of upper plate 40. The outer periphery of base section 50*c* includes a plurality of retention tabs 50*h* which are circumferentially spaced around axis 26 to be complementary to retention windows 20*j* of pump holder 20. Retention tabs 50*h* are tapered outward in a direction moving from base section 50*c* toward top section 50*a*. Consequently, when base section 50*c* is inserted into pump holder 20, retention tabs 50*h* cause the portion of pump holder sidewall 20*a* containing retention windows 20*j* to be elastically deformed outward. When base section 50*c* is inserted sufficiently far to allow retention tabs 50*h* to be aligned with retention windows 20*j*, pump holder sidewall 20*a* rebounds to is original state, i.e. pre-elastic deformation, thereby causing retention tabs 50*h* to be captured within retention windows 20*j* and retain electric motor 24 to pump holder 20. For clarity, FIG. 7 shows electric motor 24 being installed and just before retention tabs 50*h* cause the portion of pump holder sidewall 20*a* containing retention windows 20*j* to be elastically deformed outward and FIG. 8 shows electric motor 24 being completely installed such that retention tabs 50*h* are captured within retention windows 20*j* and retain electric motor 24 to pump holder 20. While retention of electric motor 24 to pump holder 20 has been illustrated herein as being accomplished through retention tabs 50*h* interlocking with retention windows 20*j*, it should be understood that retention may additionally or alternatively be accomplished through one or more of crimping, adhesive, welding, heat staking, or mechanical fasteners such as a retention clip. It should also be noted that the outer periphery of base section 50*c* mates with the inner periphery of pump holder sidewall 20*a* in an interference fit in order to prevent fuel from entering pumping section 22 without passing through inlet port 20*f*. This interference fit may be provided by a sealing bead 50*i* which protrudes radially outward from the outer periphery of base section 50*c*.

Flux carrier 52 is made of a ferromagnetic material and may take the form of a cylindrical tube. Flux carrier 52 may be made, for example only, from a sheet of ferromagnetic material formed to shape by a rolling process. Flux carrier 52 closely radially surrounds legs 50*b* of motor frame 50 and magnets 56 and axially abuts base section 50*c*. Retention of flux carrier 52 is accomplished by way of interference fit with one or more of motor frame 50 and magnets 56.

Pressure regulator 30 includes a housing 66 which is received within pressure regulator holder sidewall 28*a*, a valve member 68 located within housing 66, a valve spring 70 which biases valve member 68 toward a closed position (shown without section lines in FIG. 3), and a spring retainer 72. The elements of pressure regulator 30 will be described in greater detail in the paragraphs that follow.

Housing 66 is centered about, and extends along, axis 32 from a first end 66*a* which is distal from pressure regulator holder end wall 28*d* to a second end 66*b* which is proximal to pressure regulator holder end wall 28*d*. A central passage, which is stepped in diameter, extends through housing 66 from first end 66*a* to second end 66*b* such that a central passage first section 66*c* extends into housing 66 from first end 66*a* and such that a central passage second section 66*d*, which is smaller in diameter than central passage first section 66*c*, extends from central passage first section 66*c* to second end 66*b*. A housing shoulder 66*e*, which is transverse to axis 32, is formed where central passage first section 66*c* meets central passage second section 66*d*. The outer periphery of housing 66 is sealed to the inner periphery of pressure regulator holder sidewall 28*a*, for example by interference fit, adhesive, or mechanical seals, thereby preventing fuel from passing out from pressure regulator holder sidewall 28*a* radially between housing 66 and pressure regulator holder sidewall 28*a*. When a mechanical seal is used, a groove on the outer periphery of housing 66 may carry the mechanical seal in the form of an O-ring.

Valve member 68 is located within central passage first section 66*c* and selectively opens and closes central passage second section 66*d*. As illustrated herein, valve member 68 may be disk shaped such that valve member 68 engages housing shoulder 68*e* in order to block central passage first section 66*c* (shown without section lines in FIG. 3), thereby preventing fuel flow through housing 66 and such that valve member 68 is spaced apart from housing shoulder 68*e* (shown with section lines in FIG. 3), thereby allowing fuel flow through housing 66. However, it should be understood that valve member 68 may take other forms, which may be by way of non-limiting example only conical, frustoconical, spherical, or frustospherical. Spring retainer 72 is fixed within central passage first section 66*c* and proximal to first end 66*a* such that valve spring 70 is held in compression between valve member 68 and spring retainer 72. Compression of valve spring 70 is set by inserting spring retainer 72 within central passage first section 66*c* sufficiently far so as to require a predetermined force to cause valve member 68 to be separated from housing shoulder 68*e*. Spring retainer 72 is fixed within central passage first section 66*c*, by way of non-limiting example only through one or more of interference fit, adhesive, welding, heat staking, or mechanical fasteners. Spring retainer 72 includes a flow passage 72*a* extending axially therethrough which allow fuel to flow therethrough.

Fuel pump 16 is mounted near the bottom of fuel tank 14 and may be mounted to a fuel tank cover 74 which closes a fuel tank opening 14*a* of fuel tank 14 which allows fuel pump 16 to be installed within fuel tank 14. While fuel tank opening 14*a* has been illustrated herein at the bottom of fuel tank 14, it should be understood that fuel tank opening 14*a* may alternatively be at the top of fuel tank 14 or even on the side of fuel tank 14.

In operation, electric motor 24 is supplied with electricity, and as a result, armature 48, including motor shaft 60, rotates about axis 26. Since impeller 38 is rotationally coupled to motor shaft 60, impeller 38 also rotates about axis 26. Rotation of impeller 38 about axis 26 causes fuel to be drawn into lower plate flow channel 36*c* and upper plate flow channel 40*c* through a fuel strainer 76 which is attached to inlet port 20*f*, through inlet port 20*f* and pump holder inlet passage 20*g*. Fuel strainer 76 prevents solid foreign matter from entering fuel pump 16 in order to prevent premature wear of the moving parts. After being drawn into lower plate flow channel 36*c* and upper plate flow channel 40*c*, the fuel is pressurized within lower plate flow channel 36*c* and upper plate flow channel 40*c* as the fuel passes along each of lower plate flow channel 36*c* and upper plate flow channel 40*c*. A portion of the fuel that is pressurized is expelled through vapor bleed passage 40*e* which is directed toward electric motor 24. The fuel that is expelled through vapor bleed passage 40*e* flows between armature 48 and legs 50*b*/magnets 56 and exits at top section 50*a*, thereby providing lubrication and cooling, particularly to the interface between commutator portion 58 and first carbon brush 62/second carbon brush 64 and to the interface between motor shaft 60 and upper aperture 50*f*. However, it should be noted electric motor 24 is not a sealed container, and consequently, the fuel expelled through vapor bleed passage 40*e* is depressurized and merely flows through electric motor 24 where it mixes with the other fuel within fuel tank 14. It should be noted that a portion of this fuel flow exits electric motor 24 through first brush holder 50*d* and through second brush holder 50*e*. The remaining portion of fuel that is pressurized within lower plate flow channel 36*c* and upper plate flow channel 40*c* passes through lower plate outlet passage 36*e* and into outlet chamber 44. From outlet chamber 44, the pressurized fuel passes through outlet passage 20*i* and outlet port 20*h* where it is delivered to internal combustion engine 12. It should be noted that since outlet chamber 44 is pressurized with fuel, this pressure will force lower plate 36 into contact with upper plate 40, thereby maintaining a close clearance between impeller 38 and lower plate 36 and between impeller 38 and upper plate 40 which is necessary for maintaining pumping efficiency. In order to maintain pressure within fuel supply line 18 when fuel pump 16 is not operating, thereby aiding in restarting internal combustion engine 12, a check valve 78 may be provided within lower plate outlet passage 36*e*. Check valve 78 allows flow of fuel from lower plate flow channel 36*c* to outlet chamber 44 but prevents flow of fuel from outlet chamber 44 to lower plate flow channel 36*c*. It is important to note that by providing check valve 78 within lower plate outlet passage 36*e*, pressure regulator 30 is available to prevent excessive pressure from building within fuel supply line 18 which can result from the fuel heating and expanding when fuel pump 16 is not operating. This is importance because if excessive pressure in fuel supply line 18 is not prevented, fuel can be forced from fuel injectors of internal combustion engine 12 which is undesirable for emissions output of internal combustion engine 12. Check valve 78 may take many forms, however, for illustrative purposes, check valve 78 has been shown as a plunger which is biased into a closed position by a spring. When fuel pump 16 is operated, the pressure of fuel pumped by pumping section 22 overcomes the force of the spring, thereby opening the plunger. Check valve 78 may be omitted in systems where backflow of fuel to fuel pump 16 is not a concern, for example, when fuel pump 16 is located higher than internal combustion engine 12.

Pressure regulator 30 is exposed to the same pressure as within outlet chamber 44 due to fluid communication through pressure regulation passage 34. Consequently, pressure regulator 30 limits the pressure of fuel being supplied to internal combustion engine 12 by opening valve member 68. More specifically, when the pressure within outlet chamber 44 exceeds a predetermined threshold, the force acting on valve member 68 due to fuel pressure exceeds the force of valve spring 70 acting on valve member 68, thereby causing valve member 68 to open and allowing fuel to flow out through central passage second section 68*d*, central passage first section 66*c*, and flow passage 72*a* where the fuel mixes with the other fuel within fuel tank 14. After the pressure within outlet chamber 44 falls below the predetermined threshold, the force acting on valve member 68 due to fuel pressure no longer exceeds the force of valve spring 70, thereby causing valve spring 70 to close valve member 68.

Figure 9:
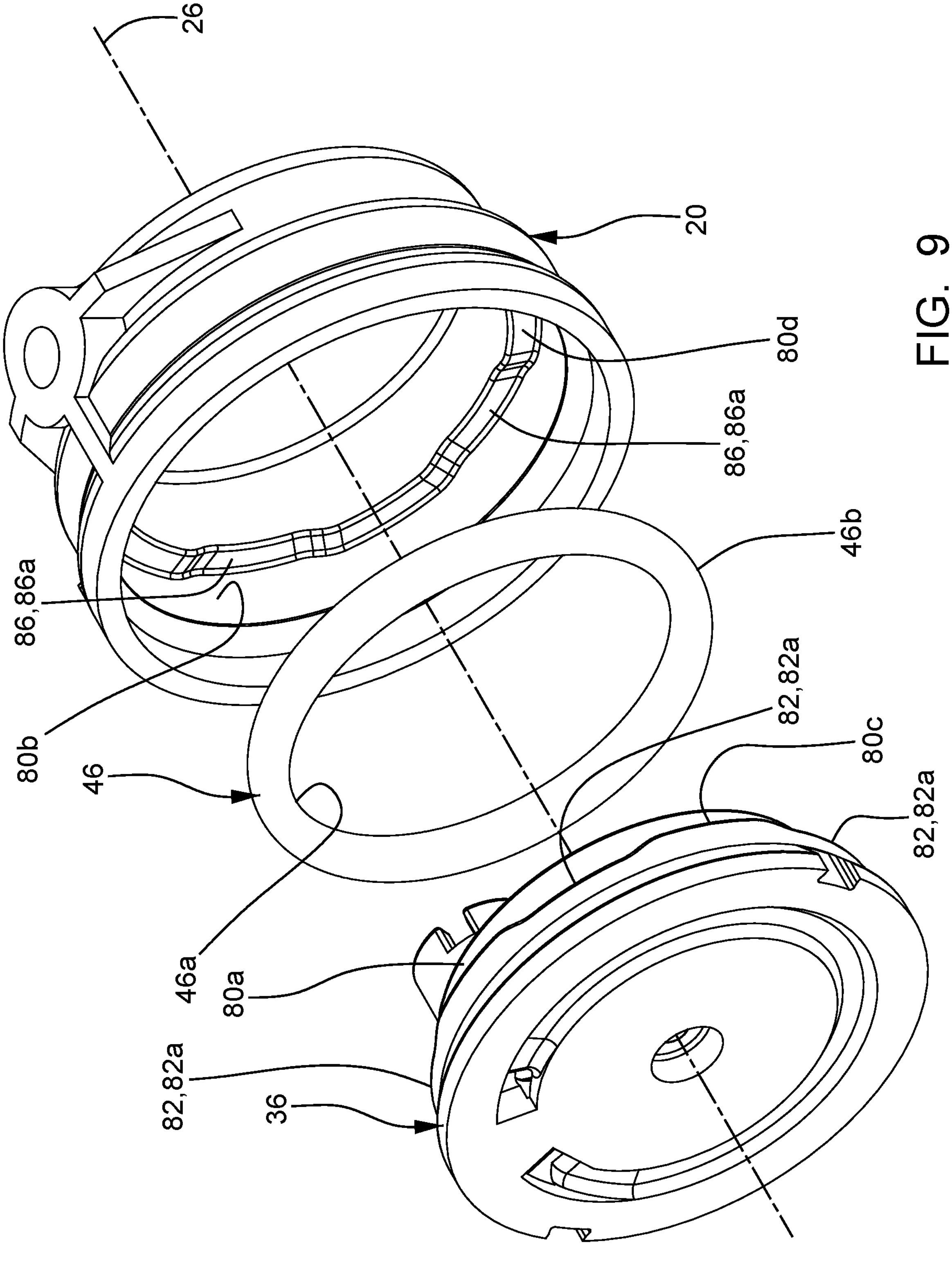
FIGS. 9 and 10 are exploded isometric views of a portion of the fuel pump which forms a sealing ring gland.
Figure 10:
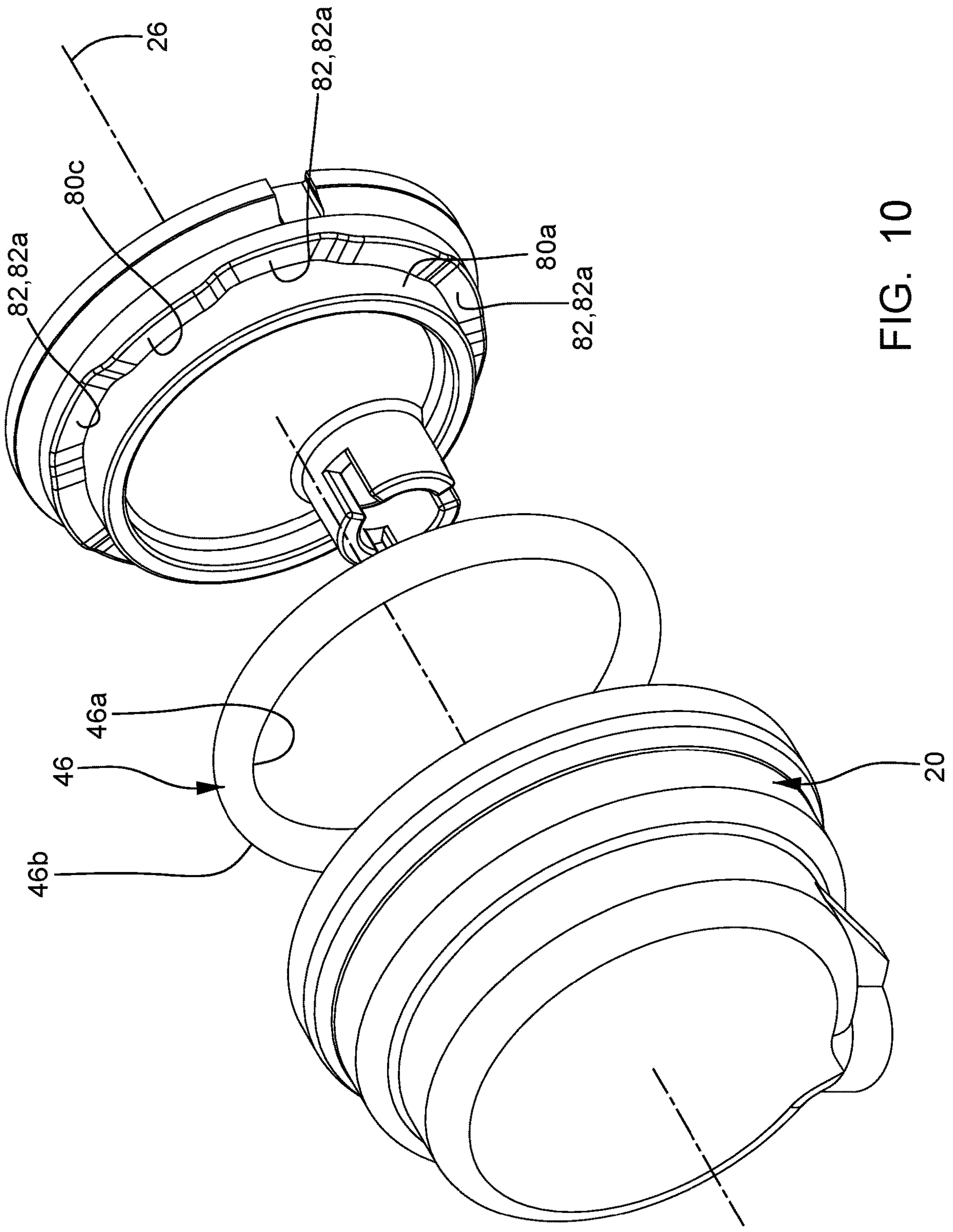
Figure 11:
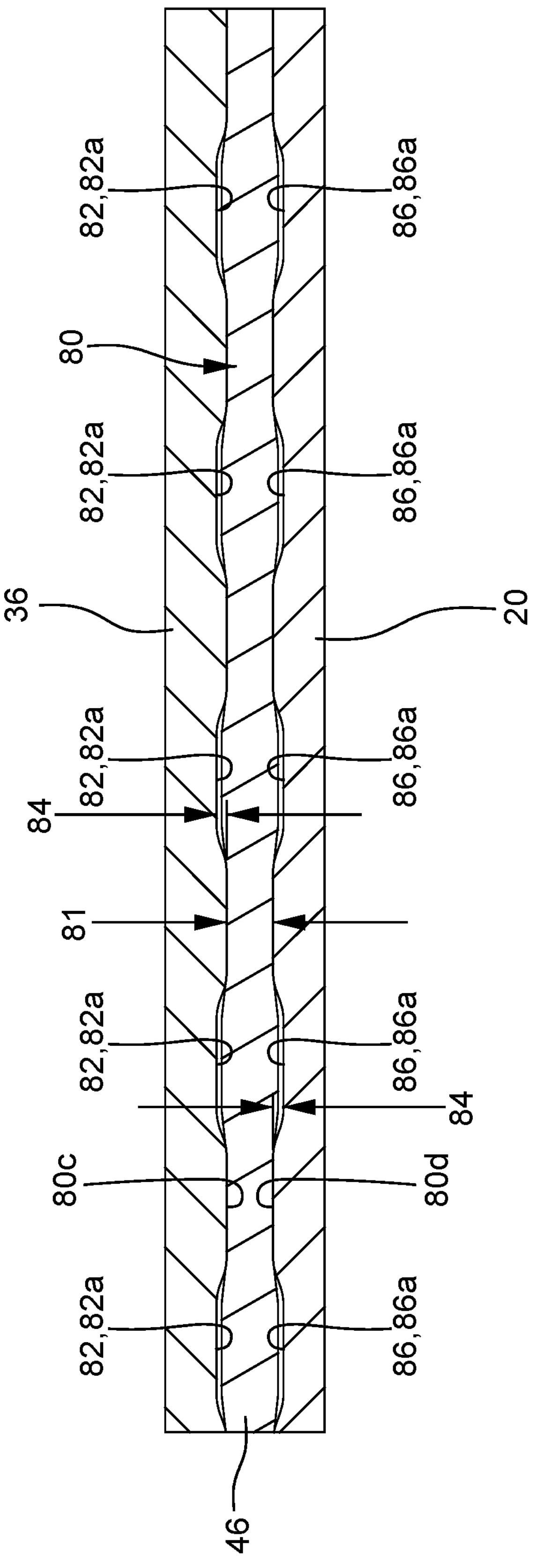
FIG. 11 is a cross-sectional view taken along a circular section line which is taken through the sealing ring gland and unrolled.

Now with particular reference to FIGS. 9-11, sealing ring 46 is received within a sealing ring gland 80 which is formed by pump holder 20 and lower plate 36. In use, sealing ring 46 is submersed in fuel, and over time, the fuel may cause sealing ring 46 to swell. Since sealing ring 46 is held in compression both axially and radially, if the swelling is too extensive, it is possible for sealing ring 46 to rupture or to fracture other components if accommodations are not made. In order to accommodate swelling of sealing ring 46, sealing ring gland 80 is provided with one or more expansion volumes which provide space for sealing ring 46 to expand upon swelling of sealing ring 46.

Sealing ring gland 80 is defined radially inward by an inner wall surface 80*a* which circumferentially surrounds axis 26 and which is configured to seal against an inner periphery 46*a* of sealing ring 46. Inner wall surface 80*a* is an outer peripheral surface of lower plate 36. As illustrated in the figures, inner wall surface 80*a* is cylindrical. In this way, sealing ring gland 80 is bounded radially inward by inner wall surface 80*a*. Sealing ring gland 80 is defined radially outward by an outer wall surface 80*b* which circumferentially surrounds axis 26, is radially offset from inner wall surface 80*a*, and is configured to seal against an outer periphery 46*b* of sealing ring 46. Outer wall surface 80*b* is an inner peripheral surface of pump holder 20. As illustrated in the figures, outer wall surface 80*b* is cylindrical. Sealing ring gland 80 is defined axially upward by lower plate shoulder 36*f* which will now be referred to as upper wall surface 80*c*. Upper wall surface 80*c* is transverse to axis 26 and is configured to axially compress sealing ring 46. In this way, sealing ring gland 80 is bounded axially upward by upper wall surface 80*c*. Sealing ring gland 80 is defined axially downward by shoulder 20*e* of pump holder 20 which will now be referred to as lower wall surface 80*d*. Lower wall surface 80*d* is axially offset from upper wall surface 80*c* by a first distance 81 and is configured to axially compress sealing ring 46 when sealing ring 46 is axially compressed by upper wall surface 80*c*.

Upper wall surface 80*c* includes a first expansion volume 82 which is recessed into upper wall surface 80*c*. As embodied in FIGS. 9-11, first expansion volume 82 comprises a plurality of circumferentially spaced recesses 82*a* which are recessed into upper wall surface 80*c*, and consequently, upper wall surface 80*c* is circumferentially segmented by circumferentially spaced recesses 82*a*. In order to provide adequate space for sealing ring 46 to swell, circumferentially spaced recesses 82*a* cumulatively extend at least 90° around axis 26. Furthermore, circumferentially spaced recesses 82*a* are recessed into upper wall surface 80*c* a second distance 84 which is greater than or equal to 10% of first distance 81 and which is less than or equal to 50% of first distance 81.

Similarly, lower wall surface 80*d* includes a second expansion volume 86 which is recessed into lower wall surface 80*d*. As embodied in FIGS. 9-11, second expansion volume 86 comprises a plurality of circumferentially spaced recesses 86*a* which are recessed into lower wall surface 80*d*, and consequently, lower wall surface 80*d* is circumferentially segmented by circumferentially spaced recesses 86*a*. Circumferentially spaced recesses 86*a* are each axially aligned with a respective one of circumferentially spaced recesses 82*a*, thereby allowing the segmented sections of upper wall surface 80*c* to be axially aligned with the segmented sections of lower wall surface 80*d* in order to provide compression of sealing ring 46. In order to provide adequate space for sealing ring 46 to swell, circumferentially spaced recesses 86*a* cumulatively extend at least 90° around axis 26. Furthermore, circumferentially spaced recesses 86*a* are recessed into lower wall surface 80*d* a second distance 84 which is greater than or equal to 10% of second distance 84 and which is less than or equal to 50% of first distance 81.

While upper wall surface 80*c* and lower wall surface 80*d* have been illustrated herein as including first expansion volume 82 and second expansion volume 86 respectively, it should be understood that one of first expansion volume 82 and second expansion volume 86 may be omitted depending on how much space is determined to be needed for swelling of sealing ring 46. Furthermore, the extent to which circumferentially spaced recesses 82*a* cumulatively extend around axis 26 and circumferentially spaced recesses 86*a* cumulatively extend around axis 26 may be tailored to provide desired amounts of space to accommodate swelling of sealing ring 46 and to provide a desired magnitude of axial compression of sealing ring 46. Even furthermore, second distance 84 can be tailored to provide desired amounts of space to accommodate swelling of sealing ring 46. The size and number circumferentially spaced recesses 82*a* and circumferentially spaced recesses 86*a* may be determined, by way of non-limiting example only, through empirical testing or computer simulation.

Figure 12:
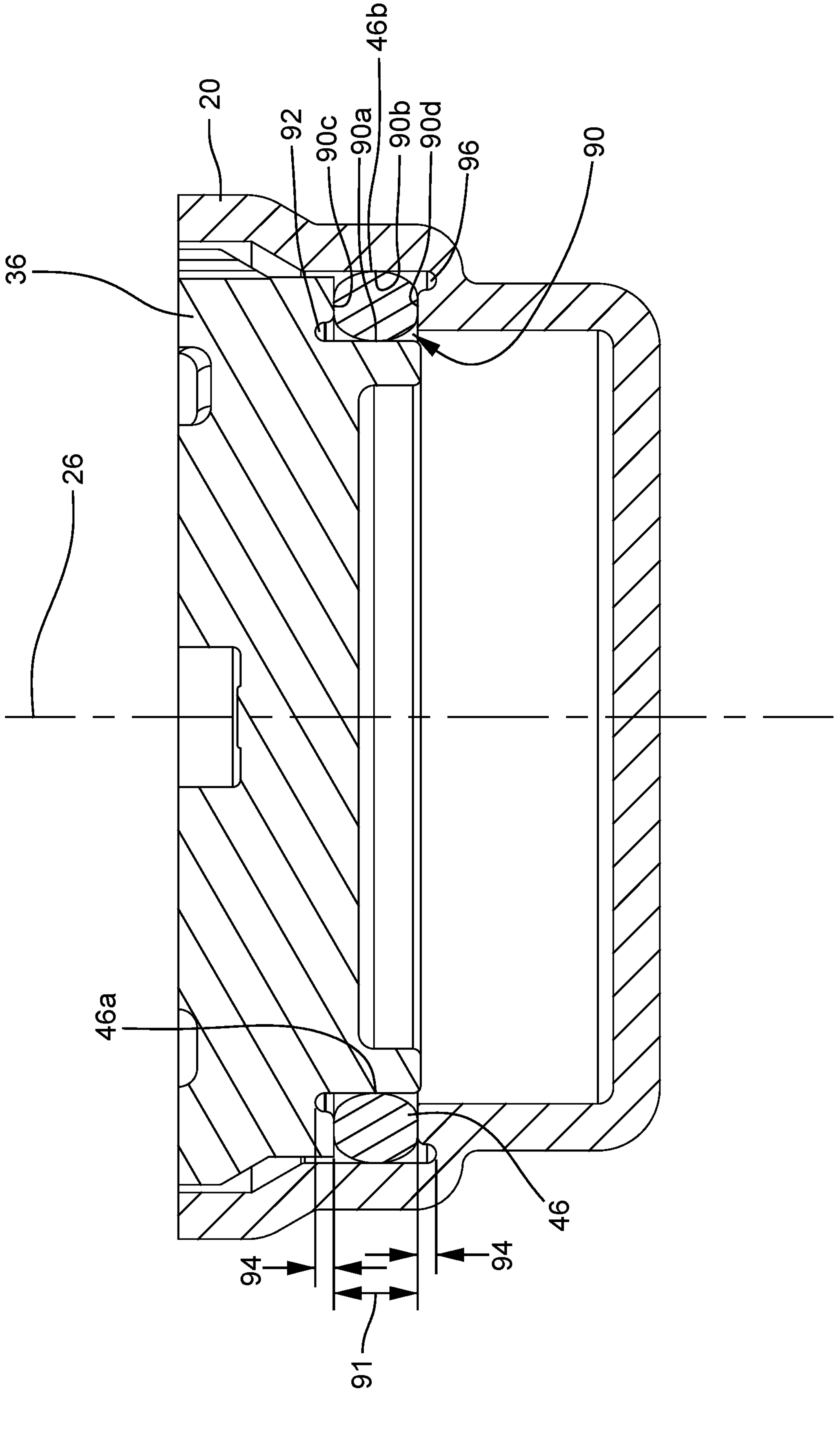
FIG. 12 is a cross-sectional view of a sealing ring gland.

In an alternative arrangement as illustrated in FIG. 12, a sealing ring gland 90 is defined radially inward by an inner wall surface 90*a* which circumferentially surrounds axis 26 and which is configured to seal against inner periphery 46*a* of sealing ring 46. Inner wall surface 90*a* is an outer peripheral surface of lower plate 36. As illustrated in the figures, inner wall surface 90*a* is cylindrical. In this way, sealing ring gland 90 is bounded radially inward by inner wall surface 90*a*. Sealing ring gland 90 is defined radially outward by an outer wall surface 90*b* which circumferentially surrounds axis 26, is radially offset from inner wall surface 90*a*, and is configured to seal against outer periphery 46*b* of sealing ring 46. Outer wall surface 90*b* is an inner peripheral surface of pump holder 20. As illustrated in the figures, outer wall surface 90*b* is cylindrical. Sealing ring gland 90 is defined axially upward by lower plate shoulder 36*f* which will now be referred to as upper wall surface 90*c*. Upper wall surface 90*c* is transverse to axis 26, is annular is shape, extends uninterrupted for 360° around axis 26, and is configured to axially compress sealing ring 46. In this way, sealing ring gland 90 is bounded axially upward by upper wall surface 90*c*. Sealing ring gland 90 is defined axially downward by shoulder 20*e* of pump holder 20 which will now be referred to as lower wall surface 90*d*. Lower wall surface 90*d* is axially offset from upper wall surface 90*c* by a first distance 91, is annular is shape, extends uninterrupted for 360° around axis 26, and is configured to axially compress sealing ring 46 when sealing ring 46 is axially compressed by upper wall surface 90*c*.

Upper wall surface 90*c* includes a first expansion volume 92, i.e. a first recess, which is recessed into upper wall surface 90*c* such that first expansion volume 92 is annular in shape, intersects with upper wall surface 90*c*, and extends radially outward from inner wall surface 90*a* such that first expansion volume 92 terminates radially outward at a location which allows sealing ring 46 to mate with upper wall surface 90*c* for a full 360°. In order to provide adequate space for sealing ring 46 to swell, first expansion volume 92 is recessed into upper wall surface 80*c* a second distance 94 which is greater than or equal to 10% of first distance 91 and which is less than or equal to 50% of first distance 91.

Similarly, lower wall surface 90*d* includes a second expansion volume 96, i.e. a second recess, which is recessed into lower wall surface 90*d* such that second expansion volume 96 is annular in shape, intersects with lower wall surface 90*d*, and extends radially inward from outer wall surface 90*b* such that second expansion volume 96 terminates radially inward at a location which allows sealing ring 46 to mate with lower wall surface 90*d* for a full 360°. In order to provide adequate space for sealing ring 46 to swell, second expansion volume 96 is recessed into lower wall surface 90*d* second distance 94 which is greater than or equal to 10% of first distance 91 and which is less than or equal to 50% of first distance 91.

While upper wall surface 90*c* and lower wall surface 90*d* have been illustrated herein as including first expansion volume 92 and second expansion volume 96 respectively, it should be understood that one of first expansion volume 92 and second expansion volume 96 may be omitted depending on how much space is determined to be needed for swelling of sealing ring 46. Furthermore, second distance 94 can be tailored to provide desired amounts of space to accommodate swelling of sealing ring 46. Inclusion of one or both of first expansion volume 82 and second expansion volume 86 and the magnitude of second distance 94 may be determined, by way of non-limiting example only, through empirical testing or computer simulation.

Fuel pump 16 as described herein which includes sealing ring gland 80 or sealing ring gland 90 having expansion volumes 82, 86 and expansion volumes 92, 96 respectively allows sealing ring 46 to provide both radial sealing and axial compression which provides axial compression of the elements of pumping section 22. Furthermore, the radial sealing and axial compression is accomplished while minimizing or eliminating the concern of rupturing sealing ring 46 or fracturing other components of fuel pump 16 by providing a volume to accommodate the swelling of sealing ring 46.

While this invention has been described in terms of preferred embodiments thereof, it is not intended to be so limited, but rather only to the extent set forth in the claims that follow.

What is claimed is:

1. A sealing ring gland which receives a sealing ring therein, said sealing ring gland comprising:

an inner wall surface which circumferentially surrounds an axis, said inner wall surface being configured to circumferentially seal against an inner periphery of said sealing ring;

an outer wall surface which circumferentially surrounds said axis and is radially offset from said inner wall surface, said outer wall surface being configured to circumferentially seal against an outer periphery of said sealing ring;

an upper wall surface which is transverse to said axis and which is configured to axially compress said sealing ring; and a lower wall surface which is transverse to said axis and axially offset from said upper wall surface and which is configured to axially compress said sealing ring when said sealing ring is axially compressed by said upper wall surface;

wherein at least one of said upper wall surface and said lower wall surface includes an expansion volume which is recessed into said at least one of said upper wall surface and said lower wall surface such that said expansion volume intersects with said at least one of said upper wall surface and said lower wall surface, wherein said expansion volume either (i) intersects with said upper wall surface, extends radially outward from said inner wall surface, and terminates radially outward at a location between said inner wall surface and said outer wall surface, or (ii) intersects with said lower wall surface, extends radially inward from said outer wall surface, and terminates radially inward at a location between said inner wall surface and said outer wall surface, or (iii) both (i) and (ii), and said expansion volume has a width in the radial direction that is less than 50% of a diameter of said sealing ring, thereby providing space for said sealing ring to expand upon swelling of said sealing ring.

2. A sealing ring gland as in claim 1, wherein:

said upper wall surface is annular in shape and extends uninterrupted for 360° around said axis;

said lower wall surface is annular in shape and extends uninterrupted for 360° around said axis; and said expansion volume comprises a first recess which is annular in shape and which intersects with said upper wall surface and also comprises a second recess which is annular in shape and which intersects with said lower wall surface.

3. A sealing ring gland as in claim 2, wherein:

said upper wall surface and said lower wall surface are axially offset from each other by a first distance;

said first recess is recessed into said upper wall surface a second distance which is which is greater than or equal to 10% of said first distance and which less than or equal to 50% of said first distance; and said second recess is recessed into said lower wall surface a third distance which is which is greater than or equal to 10% of said first distance and which less than or equal to 50% of said first distance.

4. A sealing ring gland as in claim 1, wherein one or both of said upper wall surface and said lower wall surface is annular in shape and extends uninterrupted for 360° around said axis.

5. A sealing ring gland as in claim 1, wherein said expansion volume is annular in shape.

6. A sealing ring gland as in claim 1, wherein:

said upper wall surface and said lower wall surface are axially offset from each other by a first distance; and said expansion volume is recessed into said at least one of said upper wall surface and said lower wall surface a second distance which is which is greater than or equal to 10% of said first distance and which less than or equal to 50% of said first distance.

7. A sealing ring gland as in claim 1, wherein:

said expansion volume intersects with both said upper wall surface and said lower wall surface;

said expansion volume extends radially outward from said inner wall surface and terminates radially outward at a location between said inner wall surface and said outer wall surface; and said expansion volume extends radially inward from said outer wall surface and terminates radially inward at a location between said inner wall surface and said outer wall surface.

8. A sealing ring gland as in claim 1, wherein said upper wall surface and said lower wall surface each define a shoulder having a width that is greater than 50% of the diameter of said sealing ring.

9. A fuel pump comprising:

an upper plate having an upper plate flow channel formed in a lower surface thereof;

a lower plate having a lower plate flow channel formed in an upper surface thereof such that said upper surface of said lower plate faces toward said lower surface of said upper plate;

a pumping element located axially between said upper plate and said lower plate such that rotation of said pumping element causes fuel to be drawn into, and pressurized within, said upper plate flow channel and said lower plate flow channel; and a sealing ring which is resilient and compliant and located within a sealing ring gland, said sealing ring gland comprising:

an inner wall surface which circumferentially surrounds an axis such that said sealing ring circumferentially seals against an inner periphery of said sealing ring;

an outer wall surface which circumferentially surrounds said axis and is radially offset from said inner wall surface, said outer wall surface seals circumferentially sealing against an outer periphery of said sealing ring;

an upper wall surface which is transverse to said axis and which is configured to axially compress said sealing ring; and a lower wall surface which is transverse to said axis and axially offset from said upper wall surface, said sealing ring being axially compressed by said upper wall surface and said lower wall surface such that axial compression of said sealing ring compresses said upper plate and said lower plate against each other;

wherein at least one of said upper wall surface and said lower wall surface includes an expansion volume which is recessed into said at least one of said upper wall surface and said lower wall surface, such that said expansion volume intersects with said at least one of said upper wall surface and said lower wall surface, wherein said expansion volume either (i) intersects with said upper wall surface, extends radially outward from said inner wall surface, and terminates radially outward at a location between said inner wall surface and said outer wall surface, or (ii) intersects with said lower wall surface, extends radially inward from said outer wall surface, and terminates radially inward at a location between said inner wall surface and said outer wall surface, or (iii) both (i) and (ii), and said expansion volume has a width in the radial direction that is less than 50% of a diameter of said sealing ring, thereby providing space for said sealing ring to expand upon swelling of said sealing ring.

10. A fuel pump as in claim 9, wherein:

said upper wall surface is annular in shape and extends uninterrupted for 360° around said axis;

said lower wall surface is annular in shape and extends uninterrupted for 360° around said axis; and said expansion volume comprises a first recess which is annular in shape and which intersects with said upper wall surface and also comprises a second recess which is annular in shape and which intersects with said lower wall surface.

11. A fuel pump as in claim 10, wherein:

said upper wall surface and said lower wall surface are axially offset from each other by a first distance;

said first recess is recessed into said upper wall surface a second distance which is which is greater than or equal to 10% of said first distance and which less than or equal to 50% of said first distance; and said second recess is recessed into said lower wall surface a third distance which is which is greater than or equal to 10% of said first distance and which less than or equal to 50% of said first distance.

12. A fuel pump as in claim 9, wherein one or both of said upper wall surface and said lower wall surface is annular in shape and extends uninterrupted for 360° around said axis.

13. A fuel pump as in claim 9, wherein said expansion volume is annular in shape.

14. A fuel pump as in claim 9, wherein said upper wall surface and said lower wall surface are axially offset from each other by a first distance; and said expansion volume is recessed into said at least one of said upper wall surface and said lower wall surface a second distance which is which is greater than or equal to 10% of said first distance and which less than or equal to 50% of said first distance.

15. A fuel pump as in claim 9, wherein:

said expansion volume intersects with both said upper wall surface and said lower wall surface;

said expansion volume extends radially outward from said inner wall surface and terminates radially outward at a location between said inner wall surface and said outer wall surface; and said expansion volume extends radially inward from said outer wall surface and terminates radially inward at a location between said inner wall surface and said outer wall surface.

16. A fuel pump as in claim 9, wherein said upper wall surface and said lower wall surface each define a shoulder having a width that is greater than 50% of the diameter of said sealing ring.

* * * * *